Figure 1:
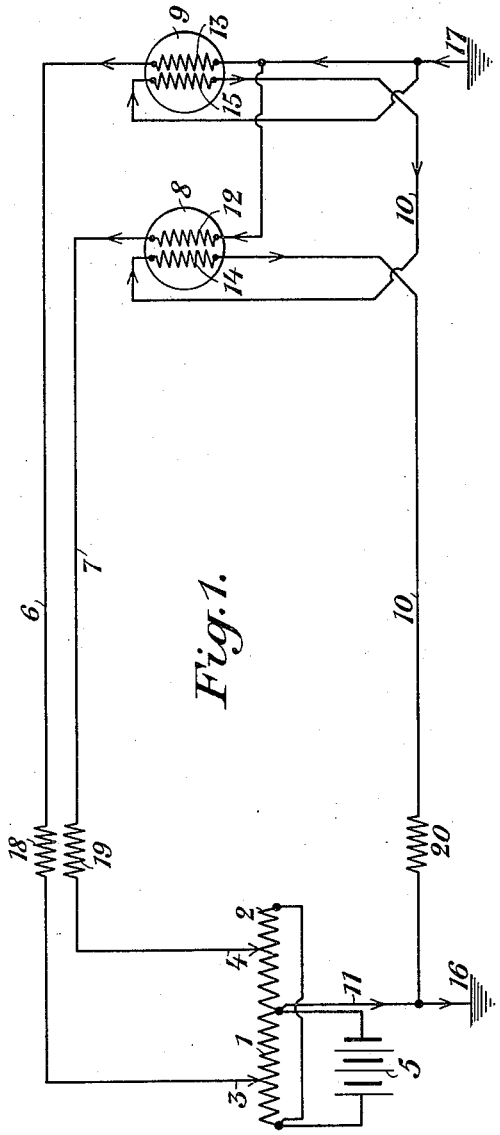

H. HOFFMANN.
SYSTEM OF ELECTRICALLY TRANSMITTING SIGNS.
APPLICATION FILED OCT. 21, 1914.

1,142,572.

Patented June 8, 1915.
2 SHEETS—SHEET 1.

WITNESSES

INVENTOR
Hermann Hoffmann
by

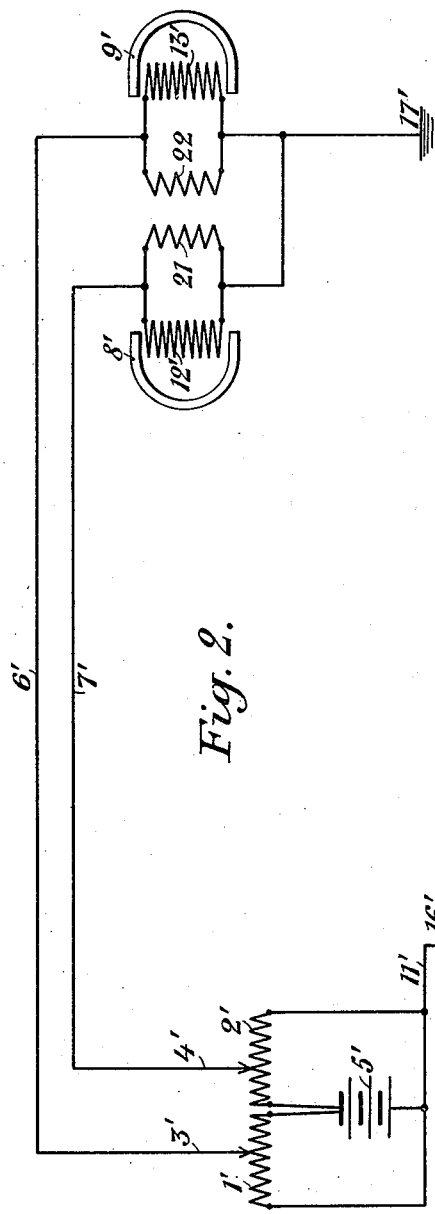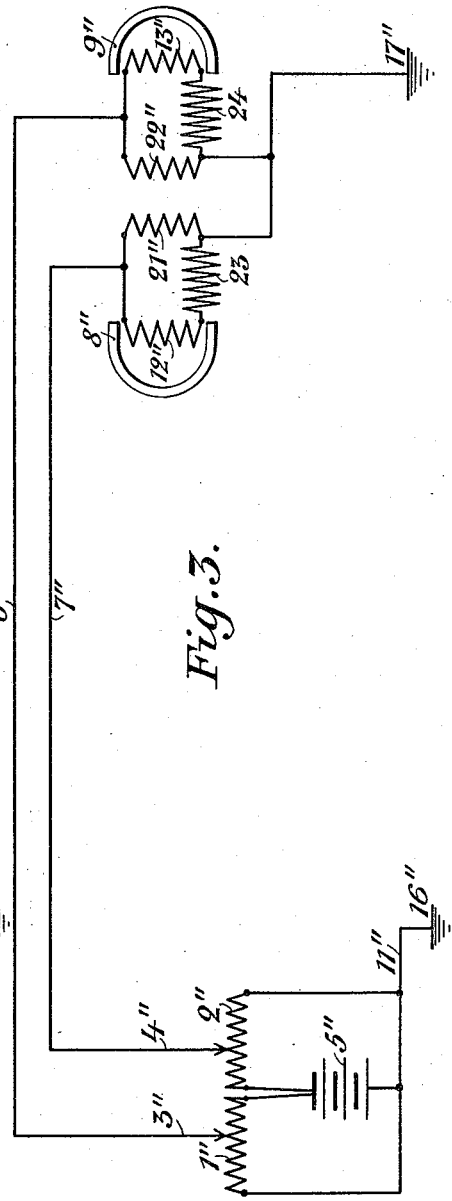

UNITED STATES PATENT OFFICE.

HERMANN HOFFMANN, OF BREMEN, GERMANY, ASSIGNOR TO THE FIRM OF TELEPANTOGRAPH-GESELLSCHAFT MIT BESCHRÄNKTER HAFTUNG, OF BREMEN, GERMANY.

SYSTEM OF ELECTRICALLY TRANSMITTING SIGNS.

1,142,572.      Specification of Letters Patent.      Patented June 8, 1915.

Application filed October 21, 1914. Serial No. 867,843.

*To all whom it may concern:*

Be it known that I, HERMANN HOFFMANN, engineer, a subject of the German Emperor, residing at 80 Yorkstrasse, Bremen, Germany, have invented certain new and useful Improvements in Systems of Electrically Transmitting Signs; and I do hereby declare the following to be a full, clear, and exact description of the invention, such as will enable others skilled in the art to which it appertains to make and use the same.

My invention relates to improvements in a system of electrically transmitting signs, and more particularly in a system in which the sign transmitting operations of the sender are transformed into two current components each of which acts on a separate apparatus provided in the receiver, and in which the return conductor for the electric current is provided by the ground. In such systems the operation of the receiving apparatus is frequently interfered with by foreign currents coming from the earth which is frequently overcharged with foreign currents, particularly near electrical central stations or large cities. Therefore the receiving apparatus are affected not only by the current impulses coming from the sender, but also by earth currents, so that the transmission of the signs is disturbed.

The object of the improvements is to provide a system in which this objection is removed.

With this object in view my invention consists in providing means in connection with the system whereby the effect of the foreign currents on the receiving apparatus is compensated.

For the purpose of explaining the invention several examples embodying the same have been shown in the accompanying drawing, in which—

Figures 1 to 3 show diagrams of electrical connections between the sender and receiver, the latter being represented only by electrical coils.

The sender and receiver may be of any known or preferred constructions, and they have not been illustrated in detail, because my invention does not relate to the construction of these parts.

In the example shown in Fig. 1 apart from the conductor provided by the earth a third conductor is provided, and by the combination of the third conductor with the earth connection the effect of the foreign currents coming from the earth can be compensated, so that the current impulses coming from the sender are not disturbed. In the said figure, the sign transmitting resistances provided in the sender have been indicated by the numerals 1 and 2, and to the said resistances electric energy is supplied from a battery 5. At one end the said resistances are connected by a conductor 11 to the earth at 16 and to a common return wire 10. From the points 3 and 4 the sign transmitting currents are taken in any known or preferred way, which currents are conducted through wires 6 and 7 to receiving members 8 and 9 of any known or preferred construction, the common return conductor 10 and the earth at 17 being connected to the ends of the coils 12 and 13 of the receiving members 8 and 9. The return wire 10 comprises coils 14 and 15 which are located in the receiving members 8 and 9 and which have the same electrical strength as the coils 12 and 13. The coils 14 and 15 are preferably connected in series, and the conductors 6, 7 and 10 can be brought into harmony by resistances 18, 19, and 20.

The currents coming from the earth pass through the conductors 6, 7 and 10 in the same direction and at equal strength, for example in the direction of the arrows shown in the Fig. 1. Therefore all the coils 12, 14 and 13, 15 of the elements 8, 9 are traversed by the same current coming from the ground, though the direction and the intensity of the said current may vary, and the coils of each apparatus are wound in opposition to each other. Therefore the current coming from the earth has no influence on the elements 8 and 9. On the other hand, the larger part of the current impulses coming from the sender for transmitting the signs to the receiver flows over the coils 12, 13, and ground 17, 16, while a small part only flows through the coils 14, 15 and wire 10. The resistance of the earth is very small, say from 5 to 20 ohms, and practically it does not affect the current components. The resistance of the conductor 10 is much higher, and to this resistance the resistance of the coils 14 and 15 is added, and in some cases even the resistance 20. Preferably the resistances of the conductors 6, 7, and 10 are the same. Therefore by providing a return wire in addition to the conductor provided by the earth and the compensating coils the earth currents are compensated and their disturbing effect on the current impulses from the sender is avoided.

In the examples shown in Figs. 2 and 3 the return conductor is provided exclusively by the earth. To avoid the injurious effect of the currents coming from the earth on the receiving apparatus bridging coils of comparatively small resistances are connected in shunt with the circuits of the receiving elements.

As shown in Figs. 2 and 3 the resistances of the sender have been indicated by the numerals 1' and 2', and 1" and 2", and the current is supplied to the resistances from batteries 5' and 5" respectively. One side of the resistances is connected to the earth at 16' and 16" over a wire 11' and 11" respectively. The sign transmitting current impulses are taken from the points 3' and 3" and 4' and 4" respectively, and the said current impulses are conducted through wires 6', 7' and 6", 7" respectively to receiving elements 8', 9' and 8", 9" of any known or preferred construction, the coils 12', 13' and 12", 13" of the receiving elements being connected to the earth at 17' and 17".

In the construction shown in Fig. 2 the coils 12' and 13' have comparatively high resistances. Small resistances 21 and 22 respectively are connected in shunt to the said coils, the said resistances being say one fifteenth to one twentieth of that of the coils 12' and 13'. For example, if the resistance of the coils 12' and 13' is about 3000 ohms each, the resistance of the coils 21 and 22 is about 150 ohms each or less. But I wish it to be understood, that these values may be different according to practical conditions, provided the resistances 21 and 22 are sufficiently small as compared to the coils 12' and 13'.

Experience has shown, that the intensity of the earth currents is very small, the maximum being a few milli-amperes. Therefore practically almost the whole amount of these weak earth currents will pass over the small resistances 21 and 22, and they will have no effect in the coils 12' and 13' of the receiving apparatus, because the amount of the current is too small.

It will be understood that the voltage of the battery located in the sender must be so strong, that to the coils 12' and 13' an amount of current is supplied which is sufficient for transmitting the signs.

The example shown in Fig. 3 is to be preferred, if the system currents are influenced not only by earth currents but also by induction currents of neighbored electric systems. In such cases besides the bridged resistances 21" and 22" I insert resistances 23 and 24 before the instrument coils 12" and 13" so that the latter can be regulated with regard to the writing currents only.

While in describing the invention reference has been made to compensating the injurious effect of currents coming from the earth, it will readily be understood, that the same arrangement may be used for avoiding the effect of induced currents. In this case, in the arrangement shown in Fig. 1 all the three conductors are uniformly induced, so that the compensating coils compensate this induction.

In the examples shown in Figs. 2 and 3 the said induced currents would directly be conducted to the earth through the bridges 21 and 22 and 21" and 22" respectively, and as the said induced currents are comparatively weak, also these examples relate to avoiding the injurious effect of the induced currents.

I claim herein as my invention:

1. A system for electrically transmitting signs, comprising a sender adapted to send two current impulses, and a receiver comprising two electromagnetic coils electrically connected with the sender for receiving each one of the impulses and through the earth as a return conductor, and compensating coils one for each of said electromagnetic coils arranged to compensate the effect of the earth currents passing through the electromagnetic coils.

2. A system for electrically transmitting signs comprising a sender adapted to send two current impulses and a receiver comprising two electro-magnetic coils electrically connected with the sender for receiving each one of the impulses and through the earth as a return conductor, and bridging conductors connected in shunt relation with said electro-magnetic coils, the electrical resistance of the bridging conductors being so small as compared to the resistance of the electro-magnetic coils and associated part of the circuit that the part of the earth current which flows through the electro-magnetic coils has practically no effect on the receiver.

3. A system for electrically transmitting signs, comprising a sender adapted to send two impulses, and a receiver comprising two electromagnetic coils electrically connected with the sender for receiving each one of the impulses and through the earth as return conductor, and bridging conductors one for each of the electromagnetic coils and connected in shunt therewith, the electric resistances of the bridging conductors being so small as compared to the resistances of the electromagnetic coils and associated parts of the circuit that the parts of the earth current which flow through the electromagnetic coils have practically no effect on the receiver.

4. A system for electrically transmitting signs, comprising a sender, and receiver comprising at least one electromagnetic coil, and an additional resistance in series therewith said sender and receiver being included at least in one circuit comprising as a return circuit the earth, and a bridging conductor connected in shunt to the electromagnetic coil and resistance, the electrical resistance of the bridging conductor being so small as compared to the resistance of the electromagnetic coil and resistance that the part of the earth current which flows through the electromagnetic coil has practically no effect on the receiver.

In testimony whereof I have affixed my signature, in presence of two witnesses.

HERMANN HOFFMANN.

Witnesses:
KARL GALLSE,
FREDERICK HOYERMANN.

Copies of this patent may be obtained for five cents each, by addressing the "Commissioner of Patents, Washington, D. C."